M. W. JOHNSON, Jr.
PRIME MOVER.
APPLICATION FILED NOV. 2, 1911.
1,140,515.
Patented May 25, 1915.
3 SHEETS—SHEET 1.
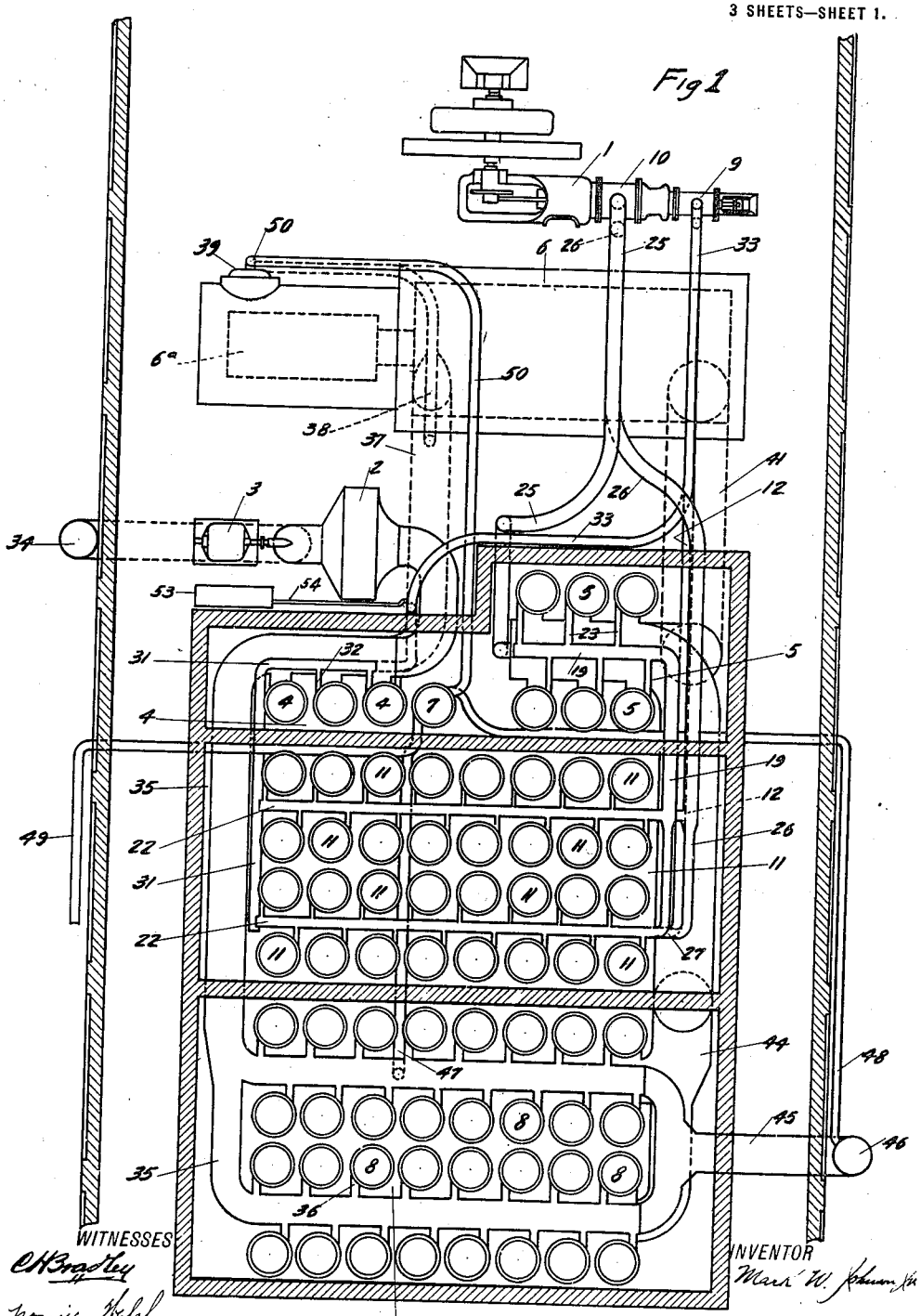
Fig 1
WITNESSES
INVENTOR
BY
ATTORNEY

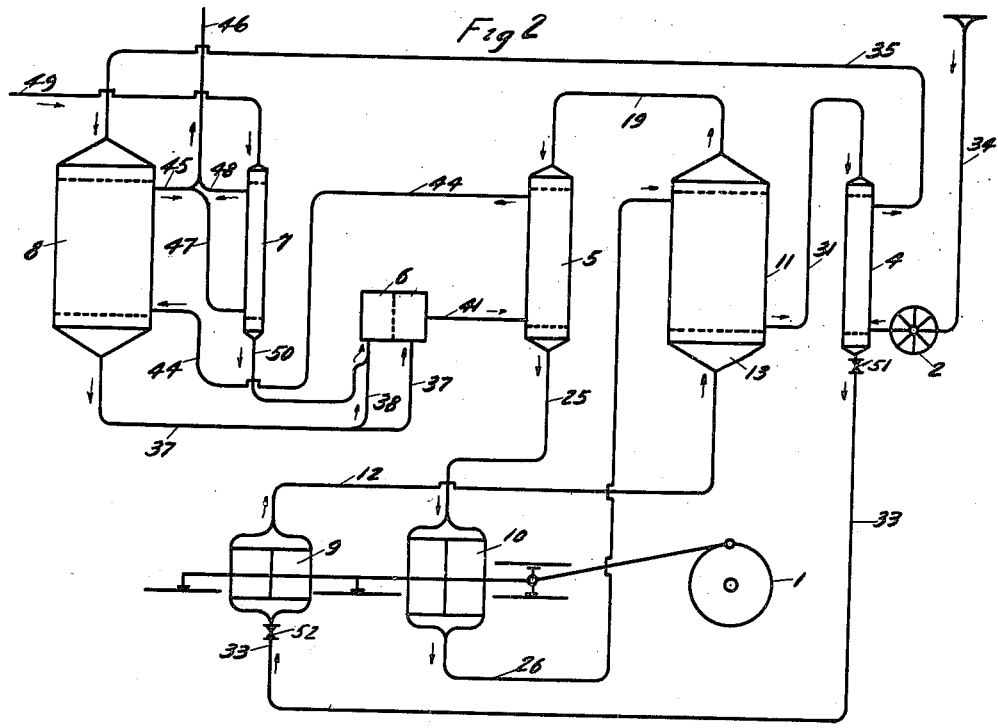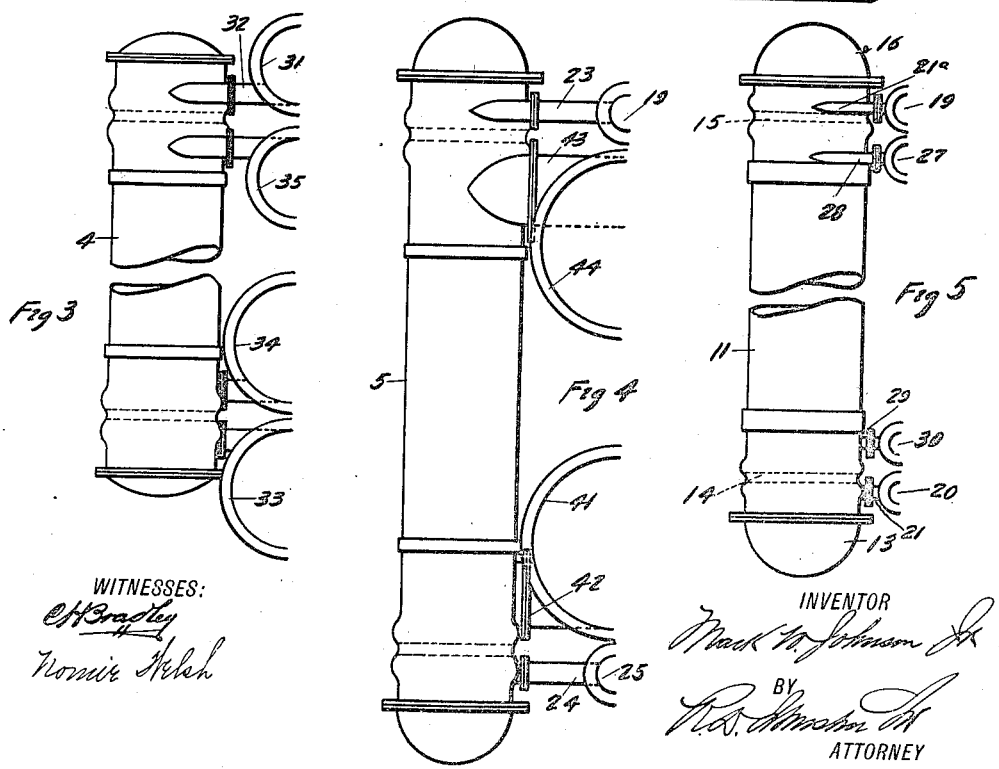

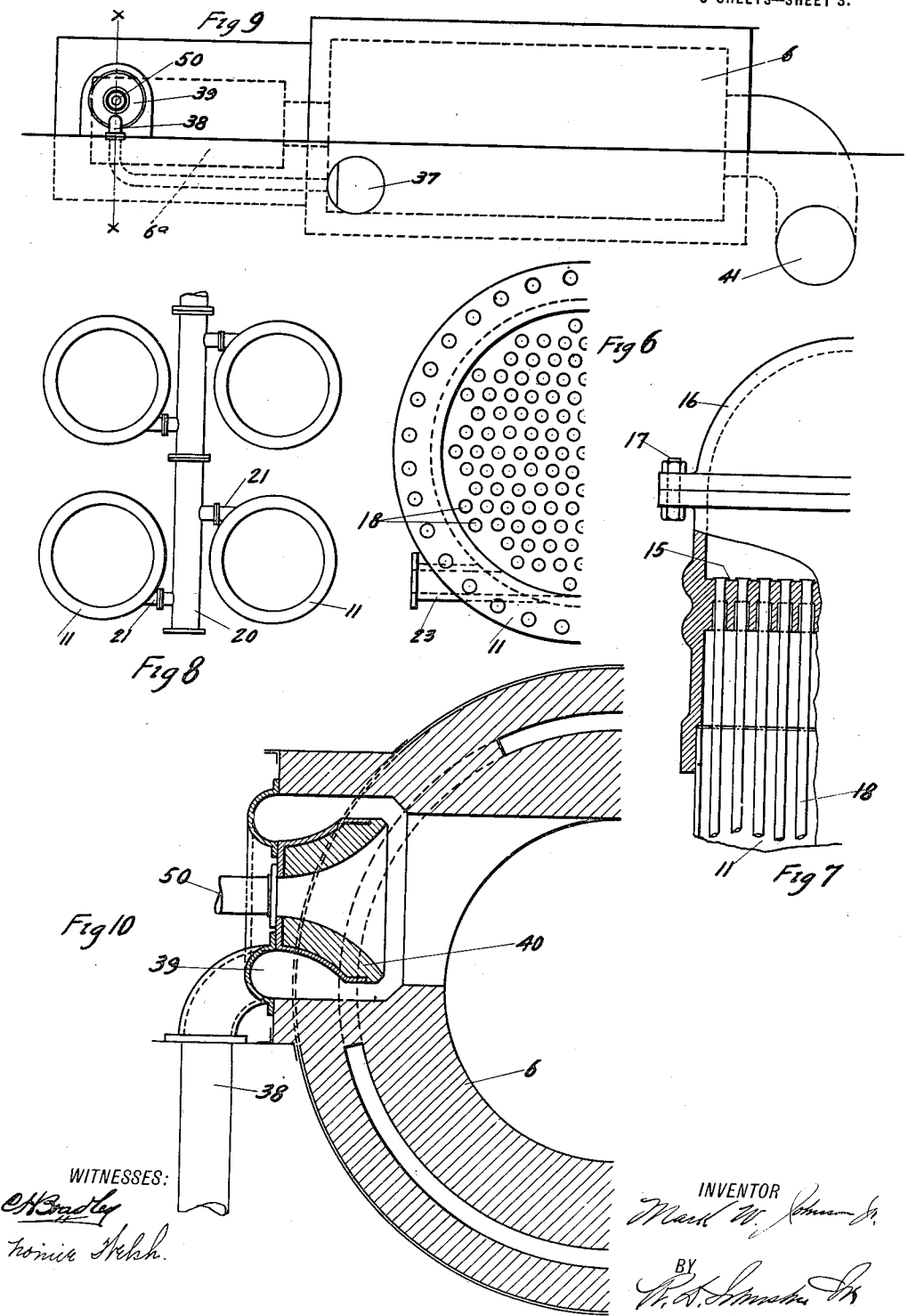

UNITED STATES PATENT OFFICE.

MARK W. JOHNSON, JR., OF ATLANTA, GEORGIA.

PRIME MOVER.

1,140,515.  Specification of Letters Patent.  Patented May 25, 1915.

Application filed November 2, 1911. Serial No. 658,242.

*To all whom it may concern:*

Be it known that I, MARK W. JOHNSON, Jr., a citizen of the United States of America, residing at Atlanta, in the county of Fulton and State of Georgia, have invented certain new and useful Improvements in Prime Movers, of which the following is a specification.

The principal objects of my invention are to provide an engine, first, of higher efficiency than the modern gas engine by eliminating the losses of heat inherent in that engine on account of the necessity of cylinder cooling and waste from the exhaust, and second, of more economic design by increasing the mean effective pressure, due to the utilization of a continuously circulating heat and power distributing medium in a closed circuit and under high initial pressure.

Engines operating by means of the adiabatic compression and expansion of a superheated gas have proven the superior efficiency of converting heat energy into motive power through such a medium over that of a liquid vaporized under pressure.

The gain of efficiency of the gas engine is due to the elimination of the vaporization and condensing features, but still its economy is not as great as possible owing to cylinder cooling and waste of heat by free exhaust, by the elimination of which the efficiency may be nearly, and, under favorable conditions, more than doubled.

Since the only practical known method of generating large quantities of heat is by combustion, and since the temperature of combustion of all fuels available for this purpose is too high for direct use inside the cylinder of an engine without cooling, it follows that the elimination of cylinder cooling can be accomplished only by the elimination of the cause thereof. Hence, I propose to use external combustion accompanied by lower temperature of the working medium such as will not be injurious to the materials of the cylinder.

As to the loss of heat by free exhaust, this is due to the fact that any gas taken at atmospheric pressure and temperature, compressed, heated and then expanded to atmospheric pressure, will emerge at a temperature above that of the atmosphere very nearly as many degrees as the degrees of heat added after compression, which latter represents the quantity of working heat available for power. Instead of letting this heat go to waste, the greater part of it may be returned into the engine by passing the exhaust through a tubular heater, or heat-transfer, in which the heat of the exhaust is transferred to the compressed gas before the latter reaches the point of application of the heat of combustion, thus reducing the quantity of heat necessary to be added in order to bring the gas up to the proper temperature for expansion.

Furthermore, after the exhaust leaves the heat transfer, it then may be passed through a cooler, cooled down nearly to atmospheric temperature and returned to the compression cylinder inlet, thus closing the circuit of the heat medium instead of having it open to the atmosphere as with free exhaust. This permits of the use of gas at a greater density than if open to the atmosphere, which gives a higher mean effective pressure in the cylinders, and therefore the piston area may be reduced accordingly, and the enormous bulk of the modern gas engine, especially when using blast furnace gas, may be so reduced as to bring the cost of construction to a point even below that of a high pressure, high speed steam engine of the same power.

In my external combustion closed cycle gas engine, the above mentioned advantages are gained as will be hereinafter more fully described and illustrated. The fuel is burned outside of the cylinders, and neither the fuel nor the products of combustion enters into them, and the fuel may be any available combustible of constant, or variable heat value without causing the engine to "kick".

In referring to my engine as a gas engine I do not mean to refer to the fuel used to apply the external heat but rather to the working medium in which heat is transmitted and which may be any available gas.

By "closed cycle" I mean that the working medium is in circulation inside the engine cylinders, pipes and heaters, passing successively through different stages without being either exhausted or replenished (except as lost by leakage).

I have decided to illustrate my invention in what I now consider its preferred form as applied to a piston engine but I do not limit myself to the particular mechanism described which may vary widely within the scope of my invention.

Referring now to the drawings illustrative of my invention:—Figure 1 is a plan view of a power plant equipment according to my invention. Fig. 2 is a diagrammatic view illustrating the circuits of the heat distributing medium and the air and gas for the external heater for said medium. Figs. 3, 4 and 5 are detail views of an air heater, a heat transfer cylinder, and a main heater for the heat distributing medium, respectively. Fig. 6 is a partial plan view enlarged of a heat transfer cylinder with the top cover removed, and Fig. 7 is a side elevation of Fig. 6 broken away to show the inner tubes. Fig. 8 illustrates the manner in which the various cylinders are connected to headers. Fig. 9 is a side elevation of the furnace for supplying the external heat to the system. Fig. 10 is an enlarged sectional view taken along the line x—x of Fig. 9.

Similar reference numerals refer to similar parts throughout the drawings.

The drawings illustrate my invention in connection with a tandem engine 1, an air blower 2 driven by a motor 3, a cooling apparatus 4 for the heat distributing medium prior to its compression, a main heater 5 for said medium just before it is delivered to the motor cylinder, a furnace 6 to supply heat to said main heater, a heater 7 for the fuel gas before it is delivered to said furnace, an air heater 8 for heating the air that is delivered to said furnace, and a compression cylinder 9 in line with the heat insulated non-cooled working cylinder 10 of the motor, which compression cylinder raises the pressure and temperature of the heat distributing medium before it enters the heat transfer 11.

The heat distributing medium, which circulates in a manner which will be hereafter described, will be referred to as the circulating medium and my invention may be best described by following this medium from the compression cylinder 9 through the entire course of its circulation back to said compression cylinder. The medium flows from the cylinder 9 through a pipe 12 and enters the bottom heads 13 of the several cylinders 11 which form the heat transfer. These cylinders 11 have double heads at each end, the inner bottom and top heads being numbered 14 and 15 (Fig. 5), and formed preferably as integral partitions, the outer top head 16 and bottom head 13 being shown connected by nuts and bolts 17 to the flanged ends of the cylinder. Tubes 18 are arranged between the inner heads 15 so that the medium entering the lower end 13 of a cylinder through the pipe 12 will pass up through the tubes 18 into the top of the cylinder and pass off thence through a pipe 19 to the top of the main heater 5. The pipe 12 is preferably connected to two cross headers 20 (Fig. 8), which are connected by short pipe sections 21 so as to deliver the medium tangentially into the bottom of the heat transfer cylinders and in like manner the pipe 19 connects with cross headers 22, which are in turn connected by short pipe sections, similar to 21ª, with the upper top ends of the cylinders above the heads 15. The pipe 19 leading from the several heat transfer cylinders 11 is connected by short tangential pipes 23 with the tops of the main heater cylinders 5 above the heads 15 therein, these cylinders being formed similarly to the cylinders 11. The medium flows down through the tubes in cylinders 5 and passes out from the bottom thereof through pipes 24 which lead from each cylinder tangentially and enter the pipe 25, which leads to the power cylinder 10 of the motor 1, being exhausted therefrom through a pipe 26 which leads to the heat transfer and connects with the several cross headers 27 (Fig. 5), which are connected to tangential inlet pipes 28 which enter the cylinders just below the heads 15. From this point the medium circulates downwardly about the tubes and passes out through the outlet pipes 29 and cross headers 30 to a pipe 31 which leads to the cooler, being connected by tangential pipes 32 with the tops of the several cylinders 4 above the heads 15 therein. The medium flows down through the tubes in the cylinders 4 and passes out from the bottom ends thereof through suitable outlets to a pipe 33 which enters the compression cylinder 9 thereby establishing a complete closed circuit for the circulating power medium.

I make provision for preheating the air which is delivered to the furnace 6 as follows: The air enters a duct 34 and is forced by the blower to enter the bottom ends of the cooler cylinders 4 just above the lower partition 14 therein. These cylinders 4 are similar to the main heater cylinders 5 (Fig. 4). The air circulates upwardly about the tubes in the cylinder 4 and in the opposite direction to the flow of the medium inside the tubes and passes out through a pipe 35 which leads to the air heater 8, the pipe 35 branching, as shown in Fig. 1, and being connected to the tangential inlet pipes 36 which enter the top heads of the cylinders above the partitions 15, causes the air to flow downwardly through the tubes in the air heater cylinders 8 and to pass off through suitable outlets and cross headers to a pipe 37 which leads from below the heads 14 to the furnace 6. A branch pipe 38 conducts the heated air to the circular passage 39 surrounding the gas inlet nozzle 40 for the furnace. The preheated air is in this manner delivered to the furnace at two points, one to produce the proper mixture of air and gas in the gas inlet nozzle to insure perfect combustion at high temperature in the combustion chamber 6ª of the furnace and the other to supply sufficient air for reducing the temperature to the desired degree in the main heating chamber of the furnace. The products of combustion flow from the furnace through a pipe 41 (Fig. 4) and are delivered by inlet pipes 42 to the bottom portions of the main heater cylinders 5 above the heads 14 therein. These products of combustion circulate upwardly in the cylinders contrary to the direction of flow of the circulating medium in the tubes therein and pass out through outlet pipes 43 to the pipe 44 which leads to the bottom of the air heating cylinders 8 entering same above the heads 14, flowing upwardly about the tubes therein and passing out the pipe 45 to the stack 46. A branch pipe 47 leads from the pipe 45 and delivers a portion of the products of combustion into the gas heater 7 above the head 14 therein, these products returning to the pipe 46 through a pipe 48. Gas is supplied to the furnace through a pipe 49 which enters the top of the gas heater 7 flowing down through the tubes therein and out from the bottom of the heater through a pipe 50 which discharges into the nozzle 40 of the furnace.

The circulating power distributing medium after leaving the compression cylinder 9 first enters the heat transfer 11 where it takes up the surplus heat of the exhaust, and then goes to the main heater 5, taking up additional heat which is supplied from the furnace by the combustion of fuel. From there the circulating medium enters the working cylinder 10 in which it expands and drives the engine 1 and when it exhausts therefrom it enters the transfer 11 outside the tubes and gives up its heat to that portion of the circulating medium which is at the same time flowing inside the tubes of the transfer to the heater 5. After thus giving up its heat the circulating medium enters the cooler 4 where its temperature is further reduced and from where it is returned to the compression cylinder 9 where it is again compressed and continues the cycle of action just described.

Free air is drawn in through the pipe 34 by the blower 2 and passes first through the cooler 4 where it removes the residual heat from the exhaust portion of the circulating medium and thus becomes warm. It then enters the air heater 8, taking on more heat from the exhaust of the heater 5 and then goes to the furnace 6, where it reaches its maximum temperature by mingling with the gases of combustion and passes up through the main heater 5. Here it gives a part of its heat to the circulating medium which is flowing through the tubes in the main heater 5 in going to the working cylinder 10. From the main heater 5 the air returns to the air heater 8 and there circulates around the tubes through which the air is flowing to the furnace and imparts its residual heat to said air. After leaving the air heater, the exhausting air enters the draft stack 46 at a comparatively low temperature and goes to waste, a small part of it being shunted through the gas heater 7 to raise the temperature of the entering gas.

The fuel gas first enters the gas heater 7 where it is warmed, and then enters the ignition chamber 6ª of furnace 6, where it comes into contact with hot air from the air heater 8 flowing through pipe 38 in sufficient quantity to give a proper mixture and combustion. The ignited gases flow at maximum heat from chamber 6ª into chamber 6 and there mingle with the main current of heated air entering through pipe 37, which lowers the temperature of the gases of combustion and raises the temperature of the incoming hot air to a required degree of heat. The mingled air and gases then pass in the manner previously described.

By using the closed circulating piping system for the motor fluid, I am enabled to use a gas which can be highly compressed, thereby giving it a great density and materially reducing the piston area in the motor for a given power. Assuming the motor fluid to have an atmospheric temperature and a pressure of 442 pounds on entering the compressor, both the temperature and the pressure of the fluid will be raised in the compressor and its temperature will be again raised in the transfer and still again raised in the main heater until it is ample for the purposes required. For example, it may enter the cylinder 10 approximately with a temperature of 900 degrees and under a pressure of 614 pounds. The exhaust from the motor will then have a pressure of 442 pounds and will have a temperature that will be above that of the atmosphere approximately as many degrees as the degrees of heat added after compression, which latter represents the quantity of working heat available for power.

In the example given, the exhaust will be approximately 777 degrees, and instead of letting this heat go to waste the greater part of it may be returned to the motor by passing the exhaust through the heat transfer 11 and through the cooler 4, the heat being transferred to the motor fluid and to the air in the cylinders 4 and 11 and thereby becoming ultimately effective in the main heater 5 to raise the temperature of the motor fluid after compression.

Whereas it is preferable to use the inclosed circulating system by reason of the fact that I am enabled to reduce the piston area proportionately to the mean effective pressure of the circulating medium, yet many material advantages would be gained for my invention as used in connection for open circulating systems where the air or gases are taken in and exhausted at substantially atmospheric temperature, as, for instance, exhausted through the valve 51 (Fig. 2), and the air or gas being taken in through the valve 52. When used on a closed circulating system the valves 51 and 52 are moved to close the free exhaust and open a pipe 33 for the circulation of gases from the cooler 4 to the compressor 9.

To maintain the quantity of the circulating medium in the closed circulating system shown, I may provide any suitable means for introducing anhydrous air compressed to or above the initial compression which the circulating medium has. I show in Fig. 1 a compressor 53 in which air suitably dried, may be compressed and delivered through a pipe 54 into the pipe 33, or at any other desired point in the piping system for the power medium. I claim as a part of my invention also the process involving the continuous use of a body of non-condensing gas under high initial compression for the generation of power in an external combustion gas engine, which may be of the reciprocating, rotary, or turbine type.

Having thus described my invention, what I claim as new and desire to secure by Letters Patent, is:—

1. An external combustion gas engine comprising a chamber wherein the energy of heat in non-condensing gases is converted into motion, a working element in said chamber driven by said gases, means to compress said gases, a heat transfer apparatus and means to cause both the compressed supply gases for and the exhaust gases from said chamber to flow therethrough in such proximity as to conduct heat from the exhaust gases to the compressed gases to assist in raising the temperature of the latter when about to enter said chamber, an extraneous source of heat to raise said compressed gases to the desired temperature before delivering them to said chamber, and means to transfer heat from the exhaust gases, leaving said heat transfer to said extraneous source of heat to augment it, substantially as described.

2. A gas engine having an external combustion furnace, a heat insulated non-cooled working cylinder, a compression cylinder, means to pass a body of non-condensing working gas operating under varying pressure and temperature through the cylinders but separated from admixture with the fuel, air and products of combustion, a blower adapted to force a blast of air always at atmospheric pressure through said furnace, a main heater into which the heat from the furnace is conveyed by said air blast and conducted therefrom to the working gas, a heat transfer in which the heat of the exhaust is conducted from the low pressure to the high pressure side of the working gas, an air heater, a cooler in which the working gas before compression is cooled by the air blast and the heat therefrom conducted by the air blast to said air heater, means to further heat the air blast in said heater by the return blast from the main heater, and means to conduct the air blast thus highly heated into the furnace.

3. In a power generating apparatus, a closed circuit piping system for the motor fluid, means to compress the fluid, and a heater to heat the compressed fluid which comprises a gas furnace, means to pass the products of combustion therefrom successively through said heater, an air heater and a gas heater, and means to supply air and gas to said furnace in a pre-heated condition by passing same through said air and gas heaters respectively.

4. In a power generating apparatus, a closed circuit piping system for the motor fluid, a compressor, a heater, an expansion cylinder, and cooling means which are severally connected up in said piping system, said cooling mechanism comprising an air cooler and a heat exchanger having juxtaposed conduits through one set of which the motor fluid flows from the expansion cylinder and through the other of which it flows from the compression cylinder to the heater, said heater comprising a gas furnace, an air heater through which the products of combustion pass from said heater, and means to take the air primarily warmed in its passage through said air cooler and through said air heater and deliver it to the gas furnace, substantially as described.

5. In a power generating apparatus, a closed piping system for the motor fluid, means to compress the fluid, and a heater to heat compressed fluid which comprises a gas furnace, an air heater, means to pass the products of combustion from said furnace through said heater and air heater, and means to supply air to said furnace in a preheated condition by passing the same through said air heater, substantially as described.

In testimony whereof I affix my signature in presence of two witnesses.

MARK W. JOHNSON, Jr.

Witnesses:
 NOMIE WELSH,
 R. D. JOHNSTON, Jr.